US007470181B2

(12) United States Patent
Gauselmann

(10) Patent No.: US 7,470,181 B2
(45) Date of Patent: Dec. 30, 2008

(54) GAMING MACHINE WITH PLAYER-SELECTED HIDDEN BONUS AWARDS AND DISPLAYED POSSIBLE AWARDS

(75) Inventor: Michael Gauselmann, Espelkamp (DE)

(73) Assignee: Atronic International GmbH, Lübbecke (DE)

( * ) Notice: Subject to any disclaimer, the term of this patent is extended or adjusted under 35 U.S.C. 154(b) by 968 days.

(21) Appl. No.: 10/716,242

(22) Filed: Nov. 17, 2003

(65) Prior Publication Data

US 2004/0142737 A1 Jul. 22, 2004

Related U.S. Application Data

(63) Continuation-in-part of application No. 10/146,565, filed on May 14, 2002.

(51) Int. Cl.
*G06F 17/00* (2006.01)

(52) U.S. Cl. .......................................................... 463/16

(58) Field of Classification Search ............. 463/16–25, 463/27, 29–32; 273/143 R, 269, 139, 138.1, 273/138.2

See application file for complete search history.

(56) References Cited

U.S. PATENT DOCUMENTS

| | | | | |
|---|---|---|---|---|
| 5,823,874 | A | 10/1998 | Adams | 463/17 |
| 5,848,932 | A | 12/1998 | Adams | 463/20 |
| 5,882,261 | A | 3/1999 | Adams | 463/20 |
| 5,997,401 | A | 12/1999 | Crawford | 463/20 |
| 6,105,962 | A | 8/2000 | Malavazos et al. | 273/143 R |
| 6,168,520 | B1 | 1/2001 | Baerlocher et al. | 463/16 |
| 6,186,894 | B1 | 2/2001 | Mayeroff | 463/20 |
| 6,439,995 | B1 * | 8/2002 | Hughs-Baird et al. | 463/20 |
| 6,514,141 | B1 | 2/2003 | Kaminkow et al. | 463/25 |
| 6,609,971 | B2 * | 8/2003 | Vancura | 463/16 |
| 6,852,028 | B2 * | 2/2005 | Vancura | 463/16 |

OTHER PUBLICATIONS

"Let's Make A Deal", A Television Show.

* cited by examiner

*Primary Examiner*—Ronald Laneau
(74) *Attorney, Agent, or Firm*—Patent Law Group LLP; Brian D. Ogonowsky

(57) ABSTRACT

In one embodiment, a gaming machine carries out a main game, such as a spinning reel type game, either using physical reels or simulated reels on a video screen. A special combination of symbols activates a video bonus game. The bonus game comprises a matrix of hidden values in the form of icons that may be selected by the player. The values that may be selected are displayed to the player in an order unrelated to the arrangement of the hidden values in the matrix so the player sees what she can possibly win. The player then makes her selections to win the hidden awards. In one embodiment, the player only makes a predetermined number of selections. In another embodiment, the player makes selections until an end-of-game value is selected. After each selection, the displayed values may change.

21 Claims, 4 Drawing Sheets

| First Pick | Second Pick | Third Pick | Total |
|---|---|---|---|
| 60x5=300 | 50x3=150 | __x1=__ | 450 |

FIG. 6

GAMING MACHINE WITH PLAYER-SELECTED HIDDEN BONUS AWARDS AND DISPLAYED POSSIBLE AWARDS

CROSS-REFERENCE TO RELATED APPLICATIONS

This application is a continuation-in-part of U.S. application Ser. No. 10/146,565, filed on May 14, 2002, incorporated in its entirety by reference.

FIELD OF INVENTION

This invention relates to games played on a gaming machine and, in particular, to a bonus game in a gaming machine, such as a slot machine.

BACKGROUND

A typical gaming machine found in casinos carries out a single game, such as displaying rotating reels having symbols, where the resulting symbol combinations correspond to awards to be paid to the player. Many newer gaming machines provide a bonus game where, for a special symbol combination, a secondary (or bonus) game is played that is different from the main game. This bonus game adds player excitement and, thus, results in a more popular and profitable gaming machine.

What is needed is a bonus game that further adds player excitement and keeps the player playing the gaming machine.

SUMMARY

A bonus game is described having direct player interaction so that the player feels responsible for the outcome of the bonus game.

In one embodiment, a gaming machine carries out a main game, such as a spinning reel type game, either using physical reels or simulated reels on a video screen. A special combination of symbols activates a video bonus game. In one embodiment, the bonus game displays an M×N matrix of hidden values in the form of icons. The unknown values may be in a format other than a matrix of icons. The hidden values may include, for example, different award credits, award multipliers, advancement to another game (such as a double or nothing game), advancement to a higher level, symbols to be collected to form a combination, and end-of-game icons. The values may be hidden behind doors or made unknown using another attractive presentation.

In one embodiment, the values behind each row of doors in the matrix are displayed to the player alongside the row in an arrangement unrelated to the arrangement of the hidden values so the player sees what she can possibly win in that row. The player then makes her selections to win the awards behind the doors.

In one embodiment, the player keeps choosing the hidden values until she chooses a zero-value option (or an end-of-game option). The bonus game then ends. In another embodiment, the player only gets a predetermined number of picks, such as three picks. In one embodiment, the displayed values for a row change once the player chooses a value in that row. In another embodiment, the displayed values for the entire matrix change once the player chooses a value.

In one embodiment, one row may have only one high value award and three zero-value awards. In rows with lower value awards, there are progressively fewer zero-value awards in that row.

In another embodiment, each pick is multiplied by a certain multiplier.

Certain awards in the matrix may initiate additional levels of the bonus game.

Other embodiments are described relating to providing the player hidden values and allowing the player to select the values.

Additional features may also be provided in conjunction with the bonus game such as the machine revealing what is behind one of the doors and allowing the player to select that door or another door, or the machine offering clues to the various options, or other type of feature.

Accordingly, the described bonus game identifies different bonus ranges to the player where each bonus range offers different risks, and the player essentially decides what risk she wants to take by making a selection within a particular bonus range.

BRIEF DESCRIPTION OF THE DRAWINGS

The below described drawings are presented to illustrate some possible examples of the invention.

FIG. 6 illustrates an optional multiplier for each value selected by the player.

DETAILED DESCRIPTION

Although the invention can typically be implemented by installing a software program in most types of modem video gaming machines, one particular gaming machine platform will be described in detail.

Figure 1:
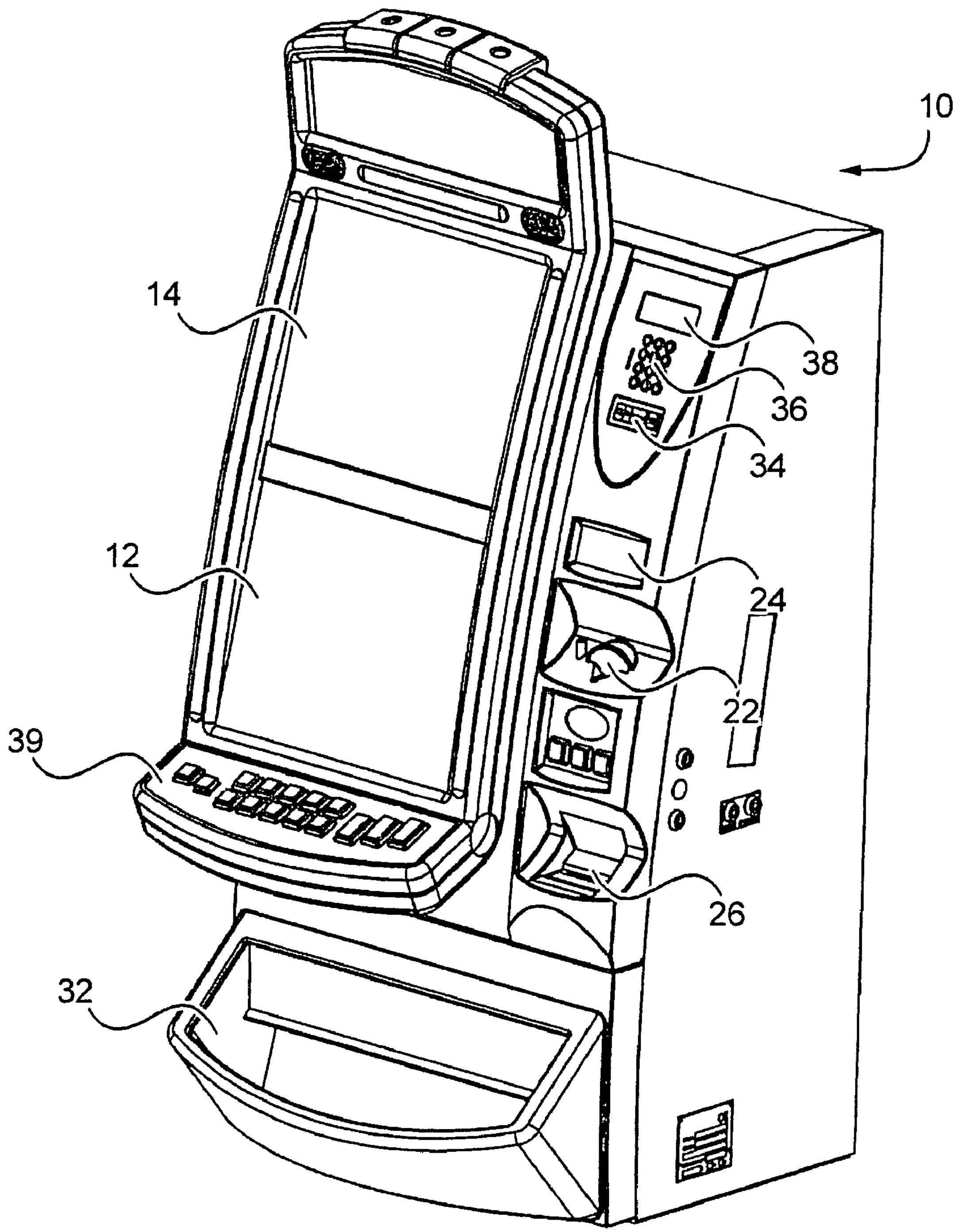
FIG. 1 is a perspective view of one of many examples of gaming machines that can incorporate the present invention.

FIG. 1 is a perspective view of a gaming machine 10 that incorporates the present invention. Machine 10 includes a display 12 that may be a thin film transistor (TFT) display, a liquid crystal display (LCD), a cathode ray tube (CRT), or any other type of display. A second display 14 provides game data or other information in addition to display 12. Display 14 may provide static information, such as an advertisement for the game, the rules of the game, pay tables, paylines, or other information, or may even display the main game or the bonus game along with display 12. Alternatively, the area for display 14 may be a display glass for conveying information about the game.

A coin slot 22 accepts coins or tokens in one or more denominations to generate credits within machine 10 for playing games. An input slot 24 for an optical reader and printer receives machine readable printed tickets and outputs printed tickets for use in cashless gaming. A bill acceptor 26 accepts various denominations of banknotes.

A coin tray 32 receives coins or tokens from a hopper upon a win or upon the player cashing out.

A card reader slot 34 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 39 include any buttons needed for the play of the particular game or games offered by machine 10 including, for example, a bet button, a repeat bet button, a play two-ways button, a spin reels button, a deal button, hold cards buttons, a draw button, a maximum bet button, a cash-out button, a display paylines button, a display payout tables button, select icon buttons, and any other suitable button. Buttons 39 may be replaced by a touch screen with virtual buttons.

Figure 2:
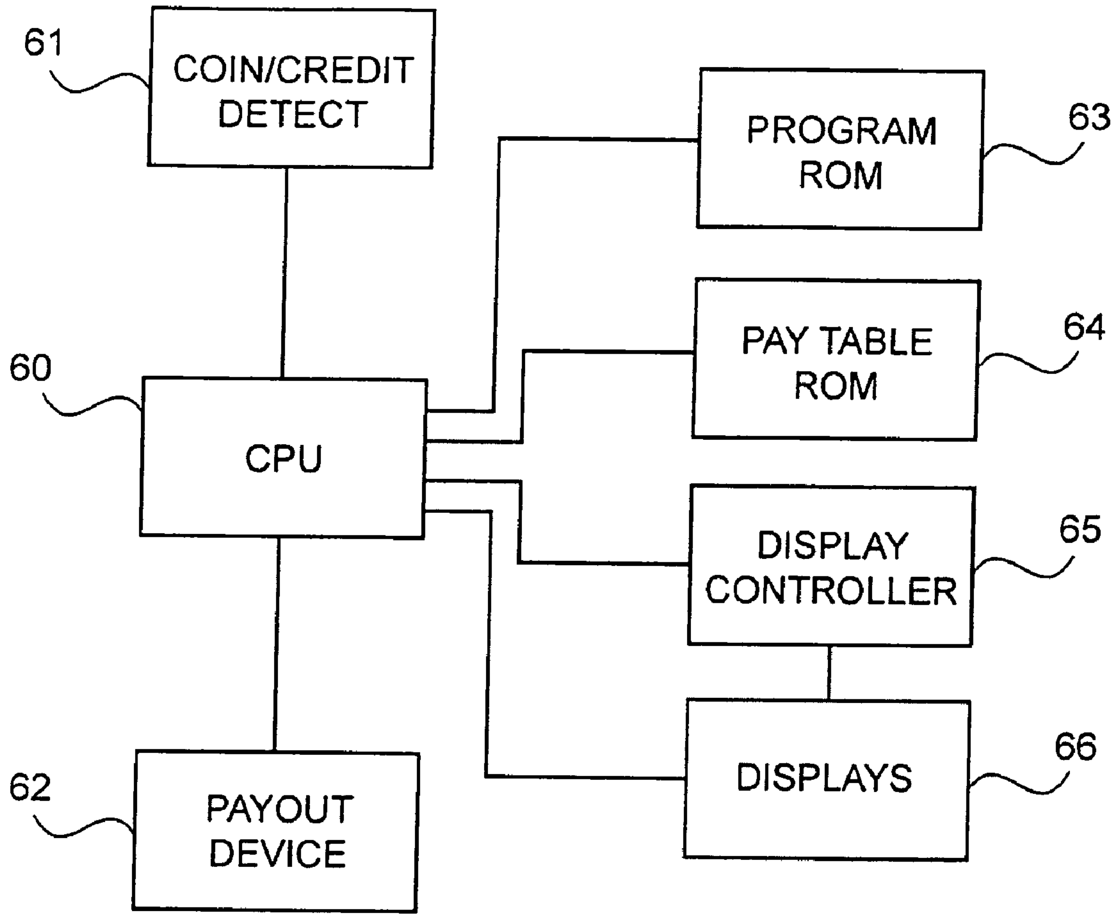
FIG. 2 is a block diagram of various key components in the gaming machine of FIG. 1.

FIG. 2 illustrates basic circuit blocks in a suitable gaming device. A control unit (CPU 60) runs a gaming program stored in a program ROM 63. A coin/credit detector 61 enables the CPU 60 to initiate a next game. A pay table ROM 64 detects the outcome of the game and identifies awards to be paid to the player. A payout device 62 pays out an award to the player in the form of coins upon termination of the game or upon the player cashing out. A payout may also be in the form of a coded paper ticket, credits on a smart card or magnetic strip card, or in any other form. A display controller 65 receives commands from the CPU 60 and generates signals for the various displays 66. If a display 66 is a touch screen, player commands may be input through the display screen into the CPU 60.

Figure 3:
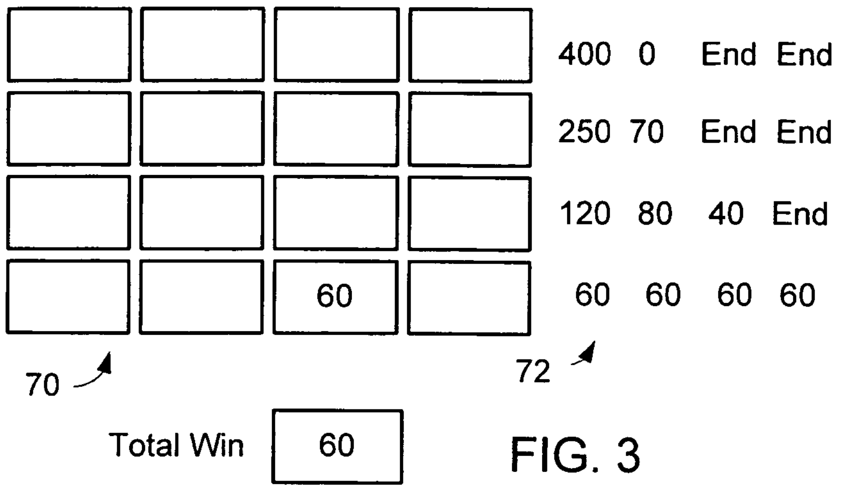
FIGS. 3-5 are simplified screen displays during a bonus game that may be played on the machine of FIG. 1, where award values are hidden behind closed doors, and the possible awards are displayed to the player.

FIG. 3 is a simplified bonus game display, which may be displayed on display 14 or display 12 in FIG. 1 after the main game has generated a particular outcome that automatically activates the bonus game. Such an outcome may be a special combination of symbols obtained in a simulated rotating reel type game. Alternatively, if the main game is a card game, the bonus game may be activated after a particular hand is obtained, such as a full house or higher. Virtually any type of game may be played as the main game and any selected outcome of the main game may activate the bonus game. Such triggering events activating a bonus game are well known, and the hardware/software used to initialize the bonus game may be conventional.

The bonus game may be presented to the player on the same screen as the main game or on a different screen. After the special outcome of the main game is achieved, the display 12 or 14 may briefly introduce and explain the bonus game.

In one example of the bonus game, shown in FIG. 3, a 4×4 matrix of doors 70 is presented to the player. The award values (e.g., credits) behind the doors in each row are displayed to the player so that the player knows the possible awards but not where they are hidden. In some rows shown, there is a zero-value award (labeled "End") that ends the bonus game. In other rows, all selections grant an award.

In the example shown, the player continues to make choices until the player chooses a zero-value award.

FIG. 3 illustrates that the player selected a door that revealed 60 credits. The player chose that row because the displayed values 72 for that row showed no end-of-game options, and the player wanted to play it safe. The displayed values 72 in other rows show higher possible awards but also a higher likelihood of an end-of-game option. The distribution of the values in the rows, including the end-of-game values, adds strategy to the player's selection.

Figure 4:
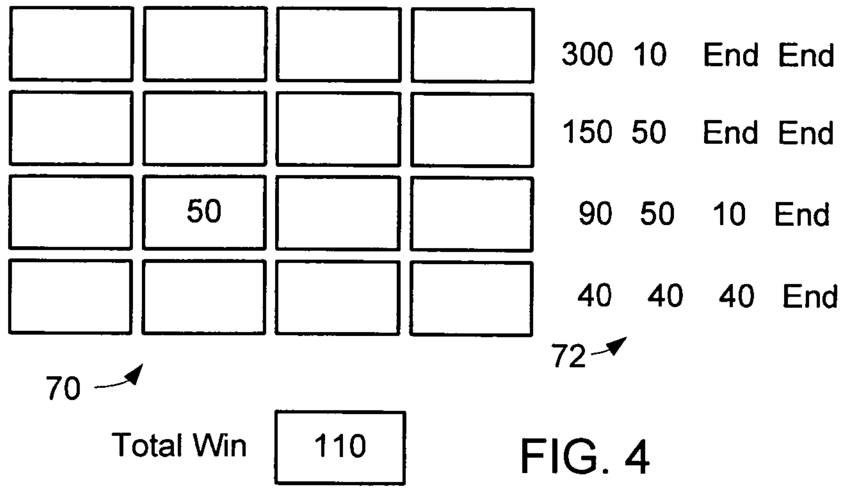
Figure 5:
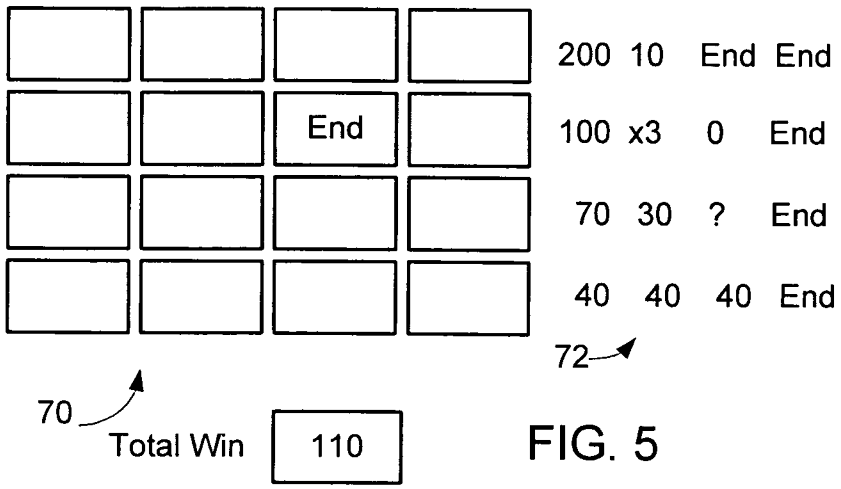

In the embodiment shown in FIGS. 3-5, all values in the matrix may change after each selection. For example, the values may generally go down after each selection, or new types of awards (e.g., multipliers) may be introduced. In another embodiment, only values in a row from which a hidden value was selected are changed. In another embodiment, any value selected from a row is replaced by an end-of-game icon for the next selection. In another embodiment, the hidden values stay the same.

FIG. 4 illustrates the screen after the values have been changed by the player's first pick in FIG. 3 and after the player has made a second selection in row 2. Her selection revealed an award of 50 credits to grant the player a total of 110 credits.

FIG. 5 illustrates the screen after the values have been again changed by the player's second pick in FIG. 4 and after the player has made a third selection in row 3. Note the displayed values 72 include a multiplier option (×3) and a mystery option represented by "?". A multiplier option multiplies any bonus award or any award from the main game. A mystery option may be any award, including a jackpot. Any type of option or value may be introduced at any time and include, for example, different award credits, award multipliers, advancement to another game (such as a double or nothing game), advancement to a higher level, symbols to be collected to form a combination, and end-of-game icons.

In FIG. 5, the player has chosen an End option, which ends the bonus game. The game then reverts back to the main game or to another bonus game.

FIG. 6 illustrates a multiplier option that may be displayed along with the game of FIGS. 3-5. In FIG. 6, each selection in FIGS. 3-5 gets multiplied by a multiplier for that selection. In one embodiment, the multiplier is fixed for that selection. The fixed multipliers may go lower with progressive selections, as shown in FIG. 6. In one embodiment, each row has its own associated multiplier (e.g., row 1 is ×2, row 3 is ×3, etc.), where a value selected in a row gets multiplied by the associated multiplier. In another embodiment, the multiplier is randomly selected either by the player or by the CPU. The multiplier may even be selected by the player selecting hidden multipliers behind doors.

In one embodiment, the player is only allowed to make a predetermined number of picks, such as three picks, and the bonus game is over after the third pick.

Various means may be used to allow the player to make her selections. In one embodiment, the display screen is a touch screen, where the player simply touches one of the doors, and a conventional touch screen sensor controls the game program to reveal what is behind that door. Other types of player controls may include buttons, where the player presses the button corresponding to one of the doors to select that door.

The excitement of the player knowing the possible values to be won coupled with the player's own interaction with the game creates a very high degree of excitement for the player. The player may use strategy in selecting from rows that offer different awards and different likelihoods of ending the game.

In all of the above embodiments, there may be more or less doors or presentations other than doors, where the player selects unknown options. Any type of icon may be used to "hide" an element (e.g., credits, symbols).

While particular embodiments of the present invention have been shown and described, it will be obvious to those skill in the art that changes and modifications may be made without departing from this invention in its broader aspects and, therefore, the appended claims are to encompass within their scope all changes and modifications that fall within the true spirit and scope of the invention.

What is claimed is:

1. A gaming method comprising:

conducting a main game, the main game having a plurality of possible outcomes, at least one of the outcomes enabling a secondary game;

after the main game generates said at least one of the outcomes, enabling the secondary game, the secondary game comprising:

displaying a plurality of icons to a player, each icon representing an unknown element that may be selected by a player;

concurrently with displaying the plurality of icons, displaying the elements to a player, before an icon is selected by the player, without identifying which icons are associated with the elements, where the elements are displayed separated from the icons;

receiving player selection signals conveying a selection of at least one of the icons; and changing at least one of the displayed elements after the player has selected at least one of the icons.

2. The method of claim 1 wherein displaying a plurality of icons to a player comprises displaying an M×N matrix of icons to the player.

3. The method of claim 2 wherein changing at least one of the displayed elements after the player has selected at least one of the icons comprises changing at least one of the displayed elements only in a row from which the player has selected one of the icons.

4. The method of claim 2 wherein changing at least one of the displayed elements after the player has selected at least one of the icons comprises changing all of the displayed elements for all rows of the matrix.

5. The method of claim 1 further comprising ending the secondary game after a predetermined number of selections by the player.

6. The method of claim 1 further comprising ending the secondary game after the player selects an icon representing an end to the secondary game.

7. The method of claim 1 further comprising multiplying any award from the secondary game by a multiplier.

8. The method of claim 7 wherein there is a different multiplier associated with each selection by the player.

9. The method of claim 1 wherein displaying the elements to a player comprises displaying one or more award values.

10. The method of claim 1 wherein displaying the elements to a player comprises displaying one or more multiplier values.

11. The method of claim 1 wherein displaying the elements to a player comprises displaying one or more end-of-game awards.

12. The method of claim 1 wherein displaying the elements to a player comprises displaying one or more mystery awards that do not identify any particular award.

13. The method of claim 1 wherein displaying the elements to a player comprises displaying an award that, if selected, initiates another game.

14. The method of claim 1 wherein displaying the elements to a player comprises displaying an award that, if selected, increases potential awards in the secondary game.

15. The method of claim 1 wherein displaying the elements to a player comprises displaying different types of awards.

16. The method of claim 1 wherein at least one of the icons, if selected, conveys a symbol, and the method further comprising receiving signals from a player selecting icons in order to obtain a predetermined combination of symbols.

17. The method of claim 1 further comprising:

after the player has made one or more selections from the icons, displaying a next level of the secondary game.

18. The method of claim 17 further comprising ending the secondary game after a predetermined plurality of different levels of the secondary game are played.

19. The method of claim 1 wherein displaying a plurality of icons to a player comprises displaying a plurality of rows and columns of icons, and wherein displaying the elements to a player without identifying which icons are associated with the elements comprises associating the displayed elements with each row containing the displayed elements so the player knows which elements are offered in each row.

20. A gaming device comprising:

a display area for displaying a main game, the main game having a plurality of possible outcomes, at least one of the outcomes enabling a secondary game; and at least one processor and display for displaying the secondary game, the secondary game comprising:

displaying a plurality of icons to a player, each icon representing an unknown element that may be selected by a player;

concurrently with displaying the plurality of icons, displaying the elements to a player, before an icon is selected by the player, without identifying which icons are associated with the elements, where the elements are displayed separated from the icons; and receiving player selection signals conveying a selection of at least one of the icons; and changing at least one of the displayed elements after the player has selected at least one of the icons.

21. The device of claim 20 wherein displaying a plurality of icons to a player comprises displaying an M×N matrix of icons to the player.

* * * * *